US009659676B2

(12) United States Patent
Golden et al.

(10) Patent No.: US 9,659,676 B2
(45) Date of Patent: May 23, 2017

(54) JET PUMP DIFFUSER STACK REPAIR

(71) Applicant: Westinghouse Electric Company LLC, Cranberry Township, PA (US)

(72) Inventors: Daniel W. Golden, Santa Cruz, CA (US); James M. DuBay, Louisville, CO (US); Stephen J. Kaylor, Los Gatos, CA (US); Rodney Lum, Dublin, CA (US); Jeffrey A. Smouse, Seven Fields, PA (US); Wendell Blane Wilton, Wilmington, NC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 402 days.

(21) Appl. No.: 14/043,084

(22) Filed: Oct. 1, 2013

(65) Prior Publication Data

US 2014/0109406 A1    Apr. 24, 2014

Related U.S. Application Data

(60) Provisional application No. 61/715,367, filed on Oct. 18, 2012.

(51) Int. Cl.
*G21C 21/00* (2006.01)
*F04F 5/46* (2006.01)
(Continued)

(52) U.S. Cl.
CPC ............ *G21C 21/00* (2013.01); *F04F 5/46* (2013.01); *G21C 15/25* (2013.01); *G21C 19/207* (2013.01); *Y02E 30/40* (2013.01); *Y10T 29/49238* (2015.01)

(58) Field of Classification Search
CPC ........ F04F 5/44; F04F 5/02; F04F 5/14; F04F 5/46; G21C 21/00; G21C 19/207;
(Continued)

(56) References Cited

U.S. PATENT DOCUMENTS 3,625,820 A * 12/1971 Gluntz .................. F04F 5/46
376/372
4,675,149 A * 6/1987 Perry .................... G21C 15/25
376/247
(Continued)

FOREIGN PATENT DOCUMENTS

EP    2060839    5/2009
EP    2154405    2/2010
JP    2000075080 A    3/2000

OTHER PUBLICATIONS

International Preliminary Report on Patentability for PCT/US2013/064422 dated Apr. 30, 2015 (Forms PCT/IB/326, PCT/IB/373, PCT/ISA/237).
(Continued)

*Primary Examiner* — David Bryant
*Assistant Examiner* — Lawrence Averick
(74) *Attorney, Agent, or Firm* — Richard J. Coldren; Westinghouse Electric Company LLC

(57) ABSTRACT

A method of repairing a slip joint on a jet pump assembly between an inlet mixer and a diffuser, with the diffuser having an opening that receives the inlet mixer with a given spacing between an outside diameter of the inlet mixer and an inside diameter of the opening in the diffuser forming an annulus whose spacing is a product of manufacture and vibration wear. The method comprises the steps of remotely accessing the annulus and narrowing a radial dimension of the annulus.

21 Claims, 8 Drawing Sheets

(51) Int. Cl.
*G21C 15/25* (2006.01)
*G21C 19/20* (2006.01)

(58) Field of Classification Search
CPC . G21C 15/25; G21C 3/334; B23P 6/00; F05B 2230/80; Y10T 29/49238; Y10T 29/49771; Y02E 30/40
USPC .......................................... 417/53, 151, 191
See application file for complete search history.

(56) References Cited

U.S. PATENT DOCUMENTS

| | | | | |
|---|---|---|---|---|
| 6,394,765 B1* | 5/2002 | Erbes | ........................ | F04F 5/44 248/230.6 |
| 7,515,673 B2* | 4/2009 | Jensen | ................... | G21C 19/02 376/302 |
| 8,345,814 B2 | 1/2013 | Ishida et al. | | |
| 8,608,121 B2* | 12/2013 | Maehara | .............. | G21C 13/032 248/231.31 |
| 8,964,929 B2* | 2/2015 | Sprague | ................ | G21C 13/032 376/372 |
| 2008/0107227 A1* | 5/2008 | Koepke | ................ | G21C 17/017 376/302 |
| 2008/0144761 A1* | 6/2008 | Jensen | ................... | G21C 19/02 376/392 |
| 2010/0242279 A1 | 9/2010 | Sprague et al. | | |
| 2012/0144641 A1* | 6/2012 | Minato | ..................... | F04F 5/54 29/402.12 |
| 2012/0170703 A1* | 7/2012 | Sprague | ................ | G21C 13/032 376/372 |
| 2012/0170704 A1* | 7/2012 | Sprague | ................ | G21C 13/032 376/372 |

OTHER PUBLICATIONS

International Search Report and Written Opinion of the International Searching Authority for PCT/US2013/064422 dated Jul. 17, 2014 (Forms PCT/ISA/220, PCT/ISA/210, PCT/ISA/237).
Westinghouse Electric Company LLC, EP Supplementary Search Report 13868987.2, Jun. 17, 2016, 6 pages.

* cited by examiner

JET PUMP DIFFUSER STACK REPAIR

CROSS REFERENCE TO RELATED APPLICATION

This application claims priority under 35 U.S.C. §119(e) to U.S. Provisional Patent Application Ser. No. 61/715,367, filed Oct. 18 2012, entitled JET PUMP REPAIR FOR A NUCLEAR POWER PLANT.

BACKGROUND

1. Field

The present invention relates to a method for repairing a jet pump and more particularly to a method for repairing the slip joint between an inlet mixer and a diffuser of a jet pump with particular benefit to jet pumps employed in boiling water reactors.

2. Related Art

As can be appreciated from FIG. 1, in conventional boiling water reactors 10, jet pump assemblies 18 are located in the reactor vessel's annulus region 12, between the core shroud 14 and a wall of the reactor vessel 16. The primary function of the jet pump is to pump coolant below the reactor core where the coolant then flows up through the fuel assemblies to extract heat from the fuel assemblies. The jet pumps are also relied upon to maintain two-thirds of the water level height in the reactor core during postulated accident conditions. For these reasons, the jet pump assemblies 18 are considered safety related components.

In a typical arrangement, twenty jet pumps are paired in ten assemblies 18, as illustrated in FIG. 2. Each jet pump assembly 18 is driven by flow from a common riser pipe 22. Jet pump flow is then directed to the lower plenum region 24 below the core supported within the shroud 14. Jet pump flow is roughly one-third driven by the reactor coolant system pump flow through the riser pipe 22, and the last two-thirds of jet pump flow is due to venturi action of the jet pump suction inlet that pulls in fluid from the annulus region 12. The jet pump assemblies 18 are circumferentially spaced around the shroud 14, supported on a shroud support ledge 20 near the bottom of the shroud.

Industry operating experience has encountered numerous instances of damage or accelerated wear to critical components of the jet pump assemblies 18 which has affected a large population of boiling water reactors both in the United States and globally. The most common jet pump components to experience damage are the main wedge and rod 26, restrainer bracket pad in the restrainer bracket 28, riser pipe 22 welds and riser brace 30, all of which components can be observed in FIG. 3, which shows an enlarged perspective view of a jet pump assembly 18. These common types of damage are all in critical supporting structures or features of the jet pump assemblies. Damage and wear are largely attributable to flow induced vibration due to normal operation. In addition to flow induced vibrations, many plants experience excessive leakage in the slip joint region 32, which can exacerbate the vibration experienced in the jet pump assemblies 18. This leakage can greatly accelerate the degradation and damage done to the jet pumps.

Plants that have shown signs of accelerated wear and component movement, both indicators of flow induced vibration issues, have historically attempted to address the problem by adding additional hardware to help support the jet pump components and reinforce the components against flow induced vibration. These solutions have generally been in the area of the restrainer bracket 28 and include larger main wedges 26, supplemental auxiliary wedges, and slip joint clamps. These solutions do not address the root cause of flow induced vibrations, have been ineffective for some plants, and their effectiveness overall is questionable.

In addition to these typical solutions, a few boiling water reactor plants have added labyrinth seals to the inlet mixer 34 original equipment manufacturer design. These labyrinth seals are intended to reduce bypass flow in the slip joint region 32 of the jet pumps; however, it appears that under certain operating conditions in some plants these seals have been ineffective and the seal geometry has been damaged on the inlet mixer's outer diameter and has caused damage to the inner diameter of the collar 38 on the diffuser 36.

In the slip joint region 32, the inlet mixer 34 is unsupported or floats, allowing the mixer to thermally expand along its length during plant startup and shutdown. The inlet mixer's bottom section fits into the collar 38 of the diffuser assembly 36, forming a slip joint. The inlet mixer 34 is laterally supported by a three-point contact at the restrainer bracket 28. This three-point contact is maintained with a sliding (main) wedge 26 and two set screws that are tack welded in place. The main wedge 26 is held in place by gravity, theoretically resulting in three-point contact. The very upper portion of the inlet mixers are supported by a pre-tensioned beam bolt assembly 40 that presses down on the inlet mixer 34 where it is seated in the transition seat 42.

Because of how the inlet mixers 34 are supported, small lateral loads on the bottom of the inlet mixer (within the slip joint 32) can create large reaction moments at the restrainer bracket 28. As previously mentioned, the main wedge 26 is held in place by its weight, typically about eight pounds, which can be overcome and lifted by small lateral forces. Since the inlet mixer 34 weighs significantly more than the wedges 26, its mass can easily overcome the holddown force of the main wedge 26 with small lateral displacements at the outlet of the inlet mixer 34 within the diffuser collar 38. Once the wedge is temporarily displaced, three-point contact is lost, and, in severe cases, the bottom of the inlet mixer may hammer against the inside of the diffuser collar 38. This hammering of the inlet mixer 34 and diffuser 36 can also be excited at particular frequencies of vibrations, potentially caused by drive flow or bypass flow in the slip joint 32.

Thus, a new solution to flow induced vibrations is desired that will address the root cause of the vibrations.

Furthermore, a solution to the flow induced vibration wear is desired that will minimize such wear and require little or no disassembly of the jet pump assembly 18.

Further, such a repair is desired that can be performed remotely, under water.

SUMMARY

These and other objects are achieved by employing a new method of repairing a slip joint on a jet pump assembly between an inlet mixer and a diffuser that has an opening that receives the inlet mixer with a given spacing between an outside diameter of the inlet mixer and an inside diameter of the opening in the diffuser forming an annulus; with the given spacing a product of manufacture and vibration wear. The method comprises the steps of remotely accessing the annulus and narrowing a radial dimension of the annulus.

In one embodiment, the method includes the step of measuring a dimension of the outside diameter of the inlet mixer that fits within the slip joint. A clamp is then fabricated having a generally circular collar clamp opening with a design diameter that is larger than the outside diameter of the inlet mixer and smaller than a maximum extent of the inside diameter of the diffuser opening. A collar clamp is then fitted around the inlet mixer and at least partially over and above the diffuser opening with the collar clamp supported by the diffuser. The collar clamp is then attached to a portion of the diffuser housing below the diffuser opening. Preferably, the measuring step measures dimensions around the diffuser opening in addition to the outsider diameter of the inlet mixer. In one embodiment, the diffuser has guides spaced circumferentially around a housing of the diffuser, with the guides extending above the opening in the diffuser that receives the inlet mixer. In the latter embodiment, the method includes the steps of forming notches in an underside of the collar clamp, in line with the guides; and fitting the notches over the guides wherein the guides restrain rotation of the collar clamp. In these embodiments, the collar clamp effectively optimizes the insertion depth of the inlet mixer within the diffuser opening. Desirably, the collar clamp is fabricated in at least two circumferential sections with each of the sections fastened together to form the generally circular opening. In this embodiment, the attaching step clamps the collar clamp to the portion of the diffuser housing, which is preferably a radially outwardly extending collar on the diffuser housing. In this latter arrangement, the collar clamp has at least two radially, outwardly extending segments that extend out radially further than the diffuser collar and the outwardly extending segments have a vertical opening therethrough. A tie bar having a radially, inwardly extending lip at a lower end positioned under the diffuser collar and a second end of the tie bar extending through one of the openings in the segments is captured on another side of the opening in the segments to tighten the collar clamp down against the diffuser collar. Preferably, the attaching step clamps the collar clamp to the portion of the diffuser housing at a plurality of discrete circumferential locations around the housing. In this arrangement, the method does not require the step of removing the inlet mixer from the diffuser.

In still another embodiment, the collar clamp has an axially extending convergent surface that faces an outer surface of the inlet mixer when the collar clamp is fitted around the inlet mixer and the collar clamp rests on a lip of the diffuser opening. In one arrangement, the collar clamp has an annular circumferential groove adjacent the generally circular clamp opening, the groove having a generally "L" shape in the radial direction with one leg of the "L" extending in a horizontal direction and resting on a lip of the diffuser opening. Preferably, the second leg of the "L" contacts an outer wall of the diffuser. The method may also insert a gasket between the collar clamp and a lip of the diffuser opening to minimize leakage.

In still another embodiment, the step of narrowing the radial dimension of the annulus comprises the step of removing the inlet mixer from the diffuser. Then, the inside surface of the diffuser opening is machined and material damage on the inlet mixer outer surface that is to be inserted into the diffuser opening is resurfaced. The method then inserts an internal collar having an outside diameter substantially equal to an inside diameter of the machined inside surface of the diffuser opening and has an inside diameter that narrows the annulus gap when the inlet mixer is inserted into the diffuser opening so that the annulus has a radial dimension that is less than the given spacing. Preferably, the internal collar is fabricated to have an axially convergent contour on a surface that opposes the outer surface of the inlet mixer.

In each of the foregoing embodiments, the radial dimension of the annulus is narrowed to be equal to or smaller than a corresponding original equipment manufacturer specification.

Alternately, in a separate embodiment, the step of narrowing the radial dimension of the annulus includes the step of cutting a collar portion of the diffuser that surrounds the inlet mixer from the remainder of the diffuser. The collar portion of the diffuser is then removed from the rest of the diffuser and the inlet mixer. A spool piece is then fabricated having a replacement opening with a desired inside diameter to replace the collar portion of the diffuser; and the spool piece is secured to the rest of the diffuser with an end of the inlet mixer within the replacement opening.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
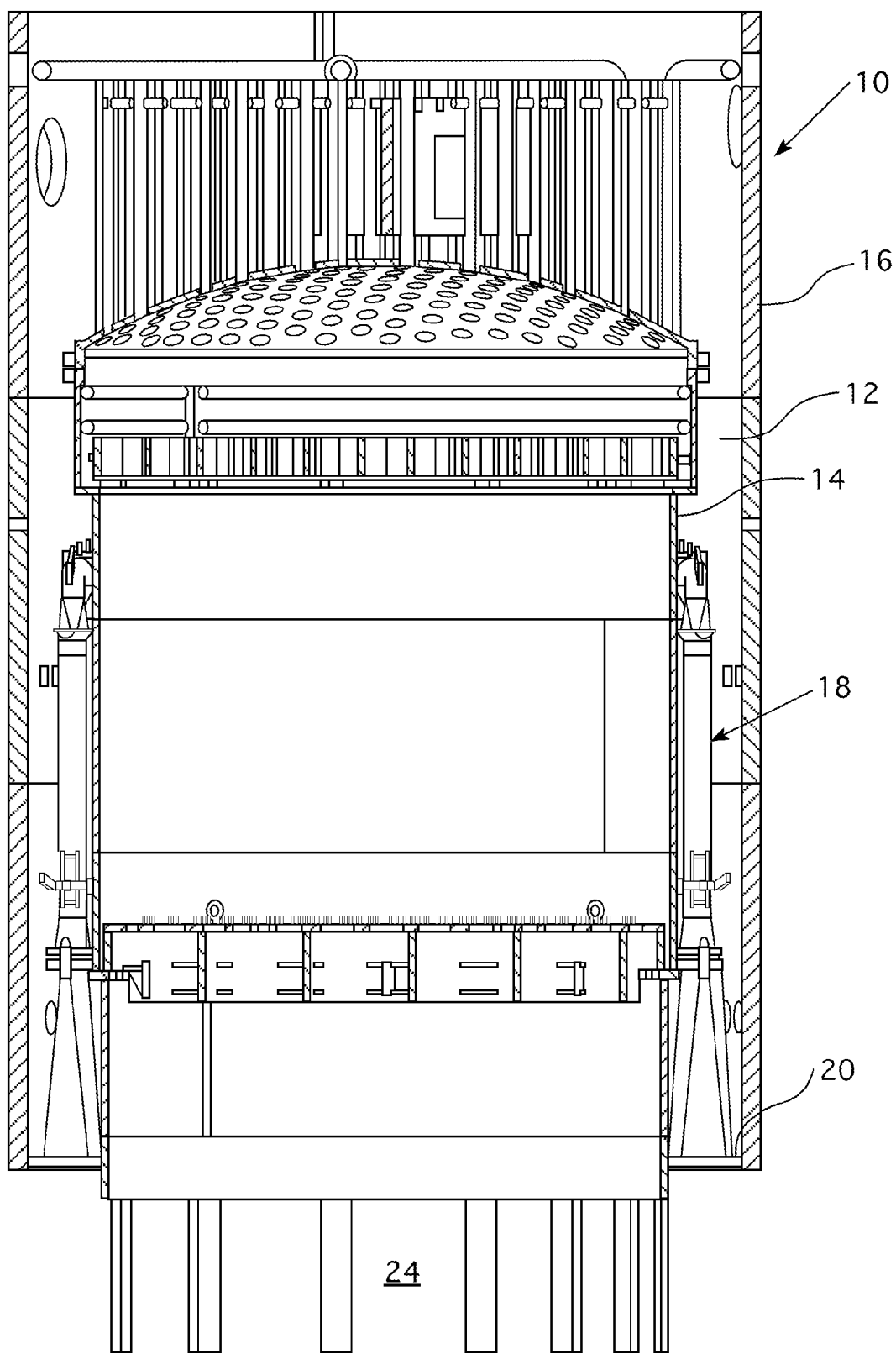
FIG. 1 is a perspective view of a boiling water reactor with the reactor vessel cut away to show the core shroud and the general placement of the jet pump assemblies.
Figure 2:
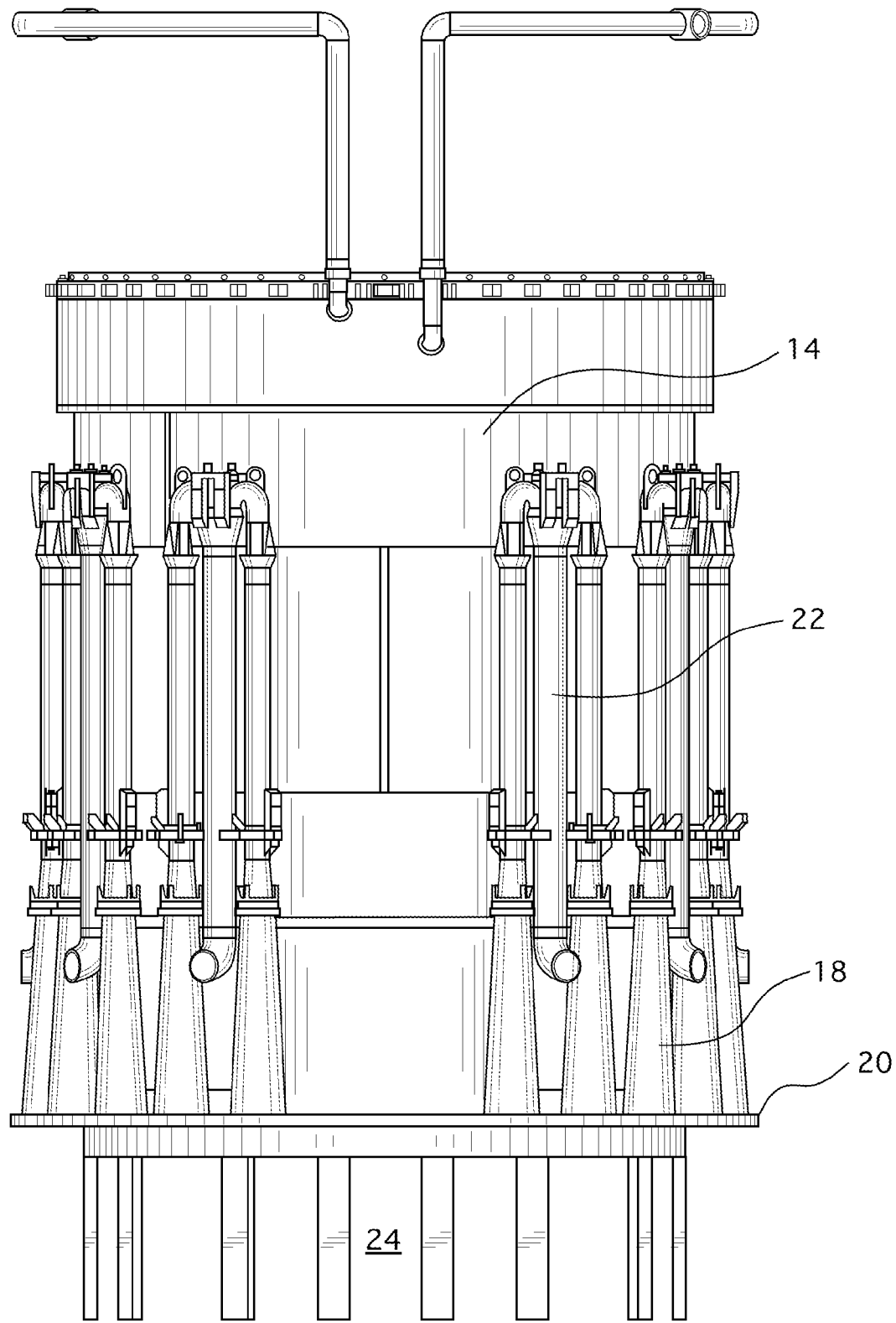
FIG. 2 is a perspective view of the core shroud of FIG. 1 with a better view of the placement of the jet pump assemblies.
Figure 3:
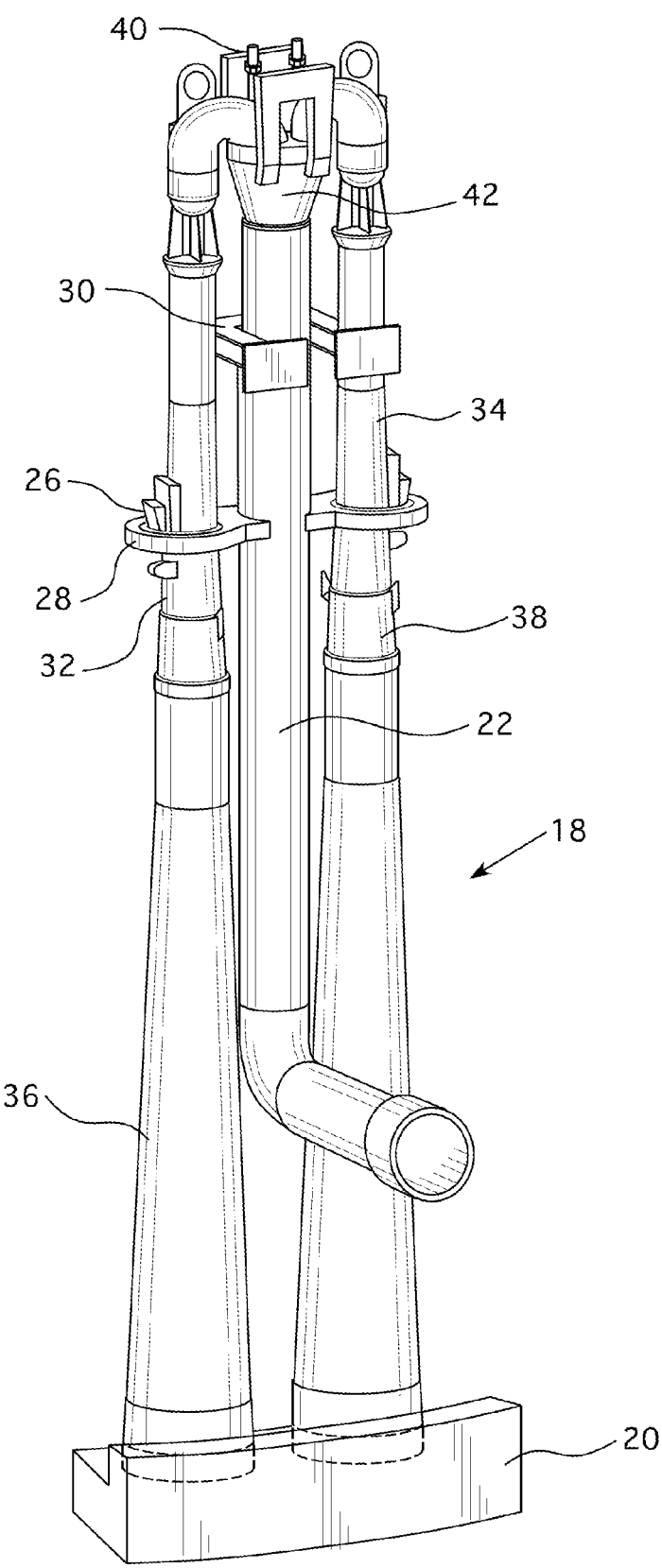
FIG. 3 is an enlarged perspective view of one of the jet pump assemblies illustrated in FIGS. 1 and 2.
Figure 4:
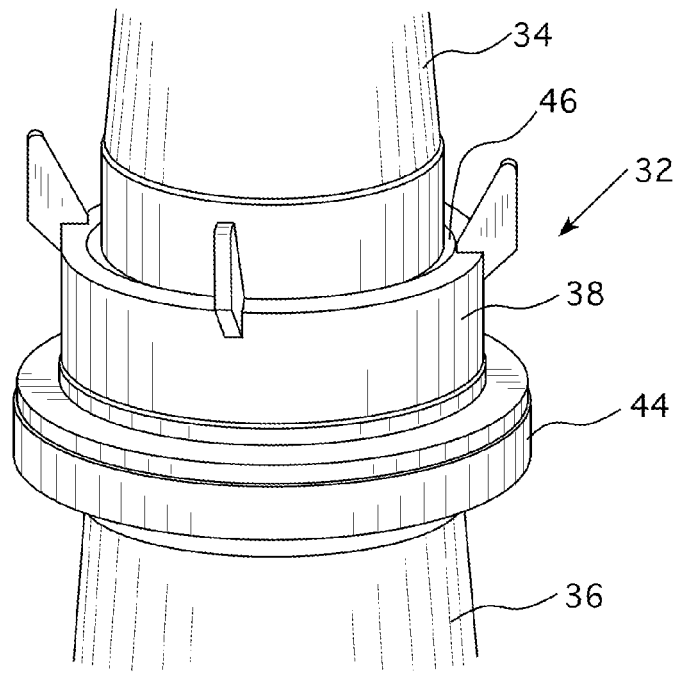
FIG. 4 is a close-up perspective view of a prior art slip joint.
Figure 5:
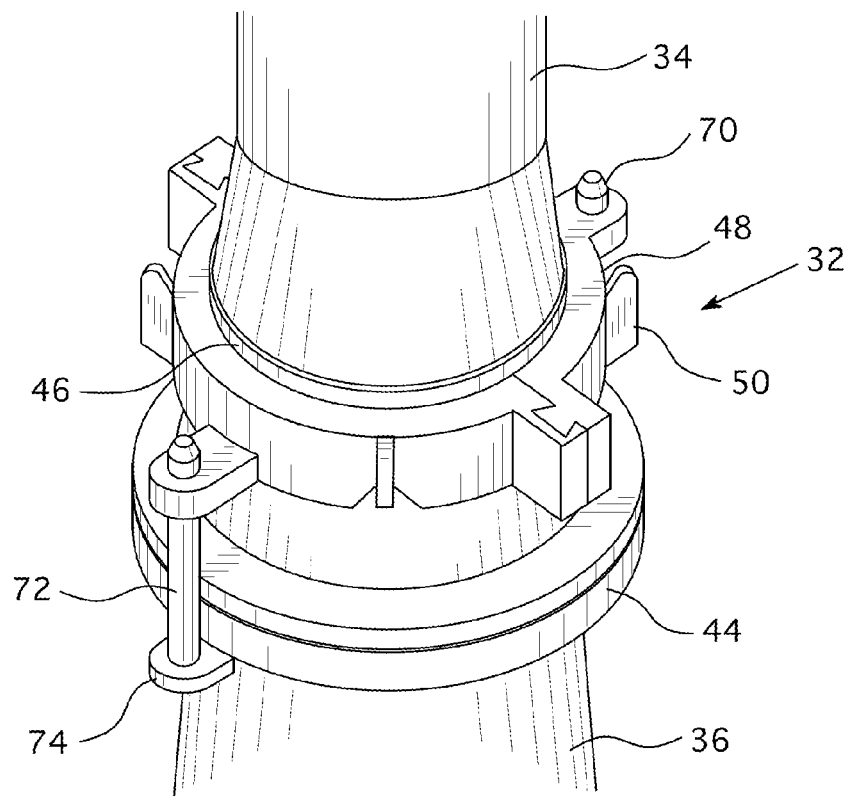
FIG. 5 is a close-up perspective view of a slip joint incorporating one embodiment of this invention.

FIG. 4 shows a close-up perspective view of the slip joint region 32 with the diffuser 36 having a radially outward projecting shoulder 44 just below the diffuser collar 38 that defines the opening 46 in the diffuser in which the inlet mixer 34 is inserted. The diffuser collar 38 has guides (sometimes referred to as ears) that extend radially outward and upward from the opening 46 to guide the inlet mixer 34 into the opening 46. According to one embodiment of the present invention, the current inlet mixer 34 and diffuser collar 38 are supplemented by stacking an additional collar clamp 48 on top of the diffuser, over and around the diffuser collar 38 as shown in FIG. 5. In addition to other benefits, the collar clamp 48 optimizes the overall insertion depth for the slip joint 32. The insertion depth of the inlet mixer 34 into the diffuser 36 has been recognized as one of several critical parameters that lead to the onset of inlet mixer vibration. In another embodiment, the collar clamp 48 is structured to create an axially convergent slip joint geometry relative to the diffuser and/or inlet mixer.

Rather than replace the existing inlet mixer, the design of the present embodiment retains and creates a new slip joint region 32 by the addition of hardware onto the top of the diffuser 36. The present invention addresses flow induced vibration issues by either: (1) using a convergent slip joint design, (2) optimizing the effective insertion depth, or (3) both using a convergent slip joint design and optimizing the effective insertion depth. FIG. 5 shows this design concept developed according to one embodiment of the invention. The embodiment shown in FIG. 5 allows for any existing damage to both the mixer and the diffuser to be left in place. A new slip joint area is created directly above the old slip joint (see FIG. 6). This design approach has the following advantages: (i) it is able to be installed in situ with no inlet mixer removal required; (ii) does not require surface repairs; (iii) provides tight tolerance control of the slip joint gap; (iv) creates an optimal insertion depth; (v) reduces overall repair time and costs; (vi) enables a convergent slip joint configuration; and (vii) provides a flow-induced vibration solution that addresses a root cause.

Figure 6:
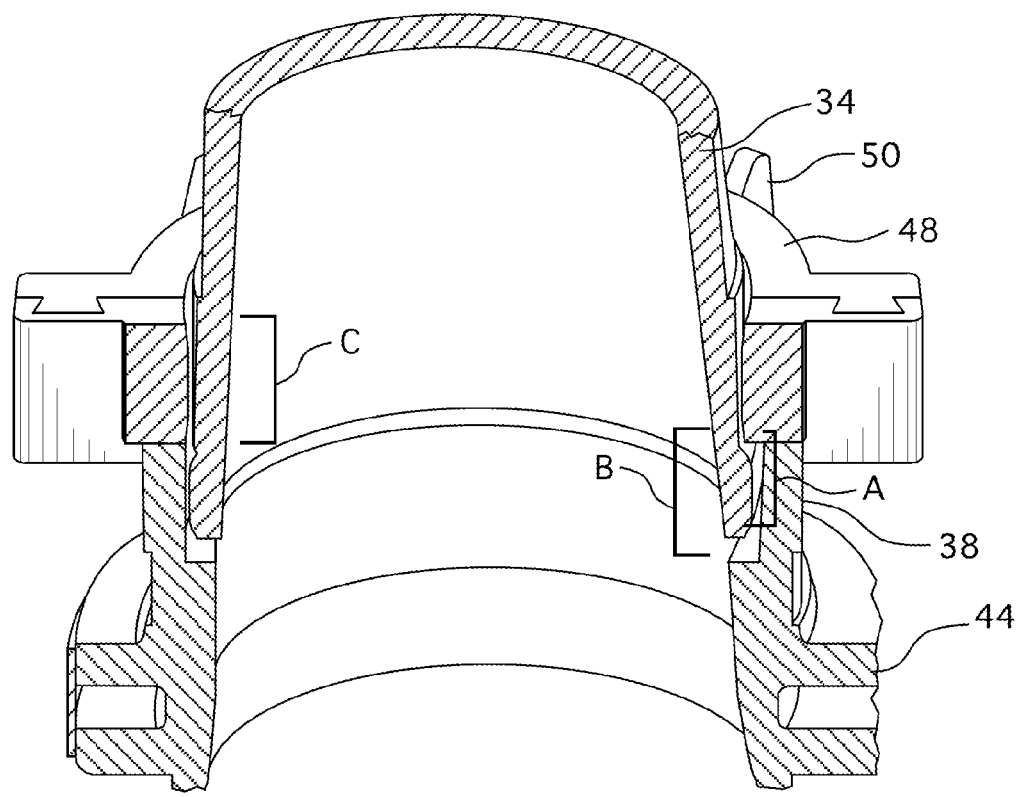
FIG. 6 is a cross section of a slip joint incorporating the embodiment illustrated in FIG. 5 showing the optimization of insertion depth of the inlet mixer.

Generally, there are two basic options for implementing an axially convergent slip joint design onto the existing diffuser components. The first option entails modifying the exiting diffuser surface by removing or adding material on its collar 38. The second option entails adding additional hardware and creating a new slip joint area above the old slip joint area, e.g., as described with respect to FIG. 5. The present invention contemplates both options. FIG. 6 is a cross section of the embodiment shown in FIG. 5; i.e., the second option mentioned above. Bracket A on the right shows the original insertion depth prior to the collar clamp 48 being installed. Bracket B, just to the left of bracket A shows the original slip joint area. Bracket C on the left shows the new improved slip joint area achieved by adding the collar clamp 48.

Figure 7:
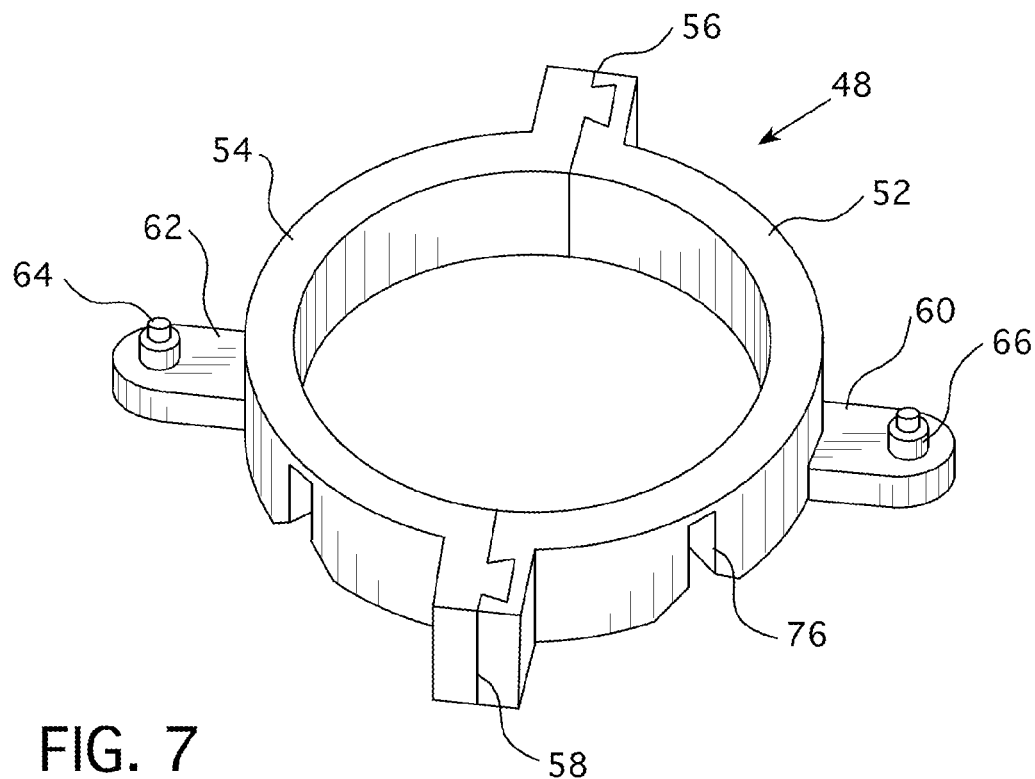
FIG. 7 is a perspective view of the clamp employed in the embodiment shown in FIG. 5.
Figure 8:
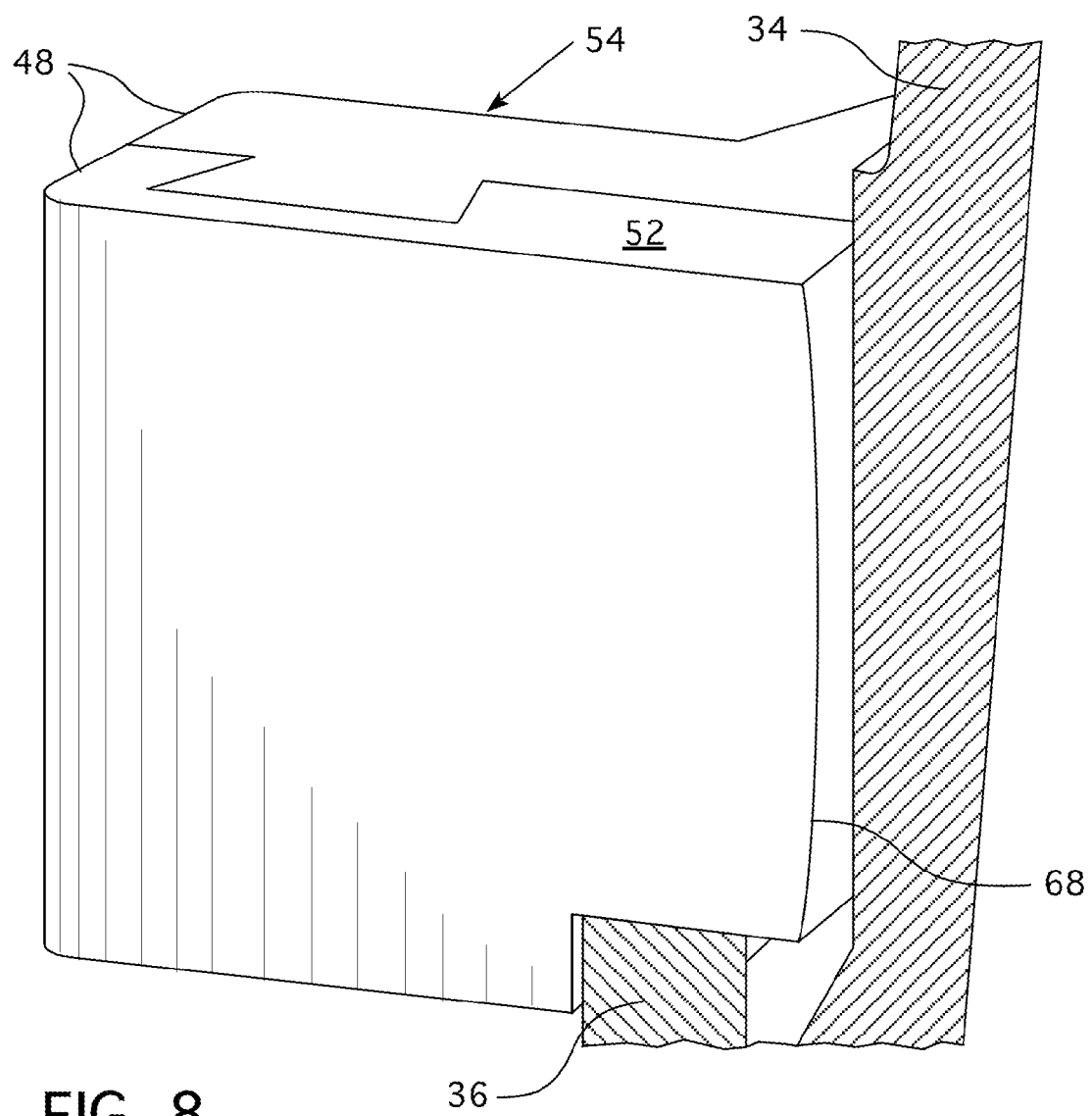
FIG. 8 is a close-up perspective view of a portion of the collar clamp employed in the embodiment of FIG. 5 supported on a lip of the diffuser opening adjacent an outer surface of the inlet mixer showing an axially convergent interface of one form of the embodiment shown in FIG. 5.

FIG. 7 shows one embodiment of the collar clamp 48 that is created from two semi-circular segments 52 and 54 which are joined by dovetail joints 56 and 58, though it should be appreciated that other means of joining the segments are available and the clamp 48 may be constructed out of two or more such segments. Each segment has a radially outwardly extending arm 60 and 62 through which holes 64 and 66 are formed that will be used to clamp the collar clamp 48 to the diffuser housing 36 as will be described hereafter. FIG. 8 is an enlarged partial sectional view of the inlet mixer 34, the diffuser 36 and the collar clamp 48 embodiment shown in FIG. 5, uncovering the convergent slip joint at the intersection between collar clamp segments. The design utilizes a convergence geometry 68, i.e., the inner face of the collar clamp 48 that faces the outer surface of the inlet mixer 34 converges toward the outer surface of the inlet mixer as one progresses from the upper and lower ends to the center of the inside face of the collar clamp 48. The convergence geometry works off an unmodified inlet mixer original equipment manufacturer outer surface design. The actual dimensions and angles can be fine tuned for each slip joint (since the existing slip joint geometry is left in place and new differential pressure conditions are created in the slip joint).

According to one embodiment of this invention, digital measurements are taken and three D models rendered of the inlet mixer 34 and diffuser collar slip joints 32, for example, using a three-D laser scanner. These measures are taken since the as-found conditions of the diffuser and mixer may differ between jet pumps (i.e., components will vary dimensionally from one another, and actual as-built dimensions are unknown). Also, the tight tolerance for the slip joint gap requires the added hardware to have high tolerance requirement for fit-up. The three-D laser scanner technology provides very accurate measurements, approximately plus/minus 0.005 inch (0.013 cm). Also, the rendered three-D model may be saved as a compatible AutoCAD file type, which allows a machine shop to use the CAD file to automatically program CNC mills and lathes to machine from hardware blanks which meet these tight tolerances.

According to the current embodiment, the collar clamp configuration uses two stack halves 52, 54 that interlock the dovetail joints 56, 58 formed at their circumferential ends; see FIG. 7. To ensure the collar clamp 48 cannot be raised up off of the diffuser upper lip, two tie bars 70, 72 clamp down on the collar clamp 48; leveraging off of the bottom edge of the diffuser shoulder 44. Each tie bar has a laterally inwardly extending projection 74 that seats under the diffuser shoulder 44 against which the tie bars 70, 72 react to maintain the collar clamp 48 pressed against the upper lip of the diffuser opening 46 (FIG. 5). The upper portion of the tie bars is threaded so that nuts can tighten down the tie bars, applying a slight preload. Preferably, these nuts are crimped in place by crushable material built in to the nut or collar clamp 48.

A crushable gasket may be employed if needed between the diffuser stack 48 and the diffuser lip to ensure there is no leakage at their interface. In order to prevent the collar clamp from rotating, the diffuser guides 50 are used as support surfaces. The diffuser guides (often called ears) purpose is to help align and aid in the insertion of the inlet mixer 34 during jet pump reassembly. Notches 76 are formed in the underside of the collar clamp that allow the external collar clamp 48 to fit over the ears 50 and down onto the diffuser lip. These notches also prevent the collar from rotating. The ear recesses in the collar clamp may allow some leakage, but only small amounts of bypass flow are likely.

The hardware shown in the embodiment illustrated in FIG. 5 is light enough that the two stack halves can be delivered remotely using tool poles. Much of the tooling necessary for installation exists, and minimal if any new hardware handling tooling is required. While the current embodiment illustrates one design for clamping the stack halves together, it should be appreciated by those skilled in the art that this invention is not limited to this particular embodiment.

Figure 9:
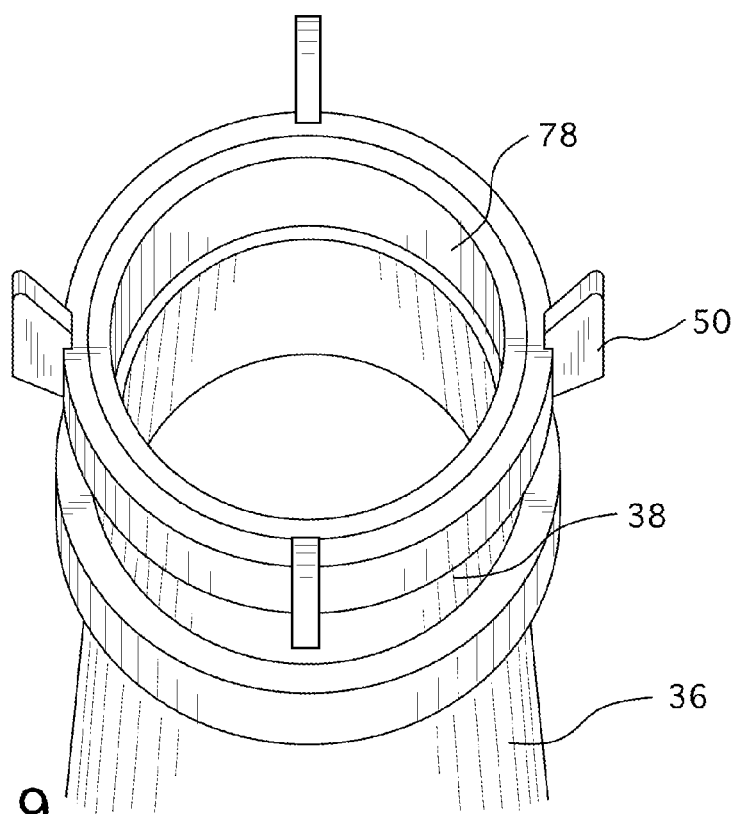
FIG. 9 is a perspective view of a diffuser collar illustrating another embodiment of this invention.
Figure 10:
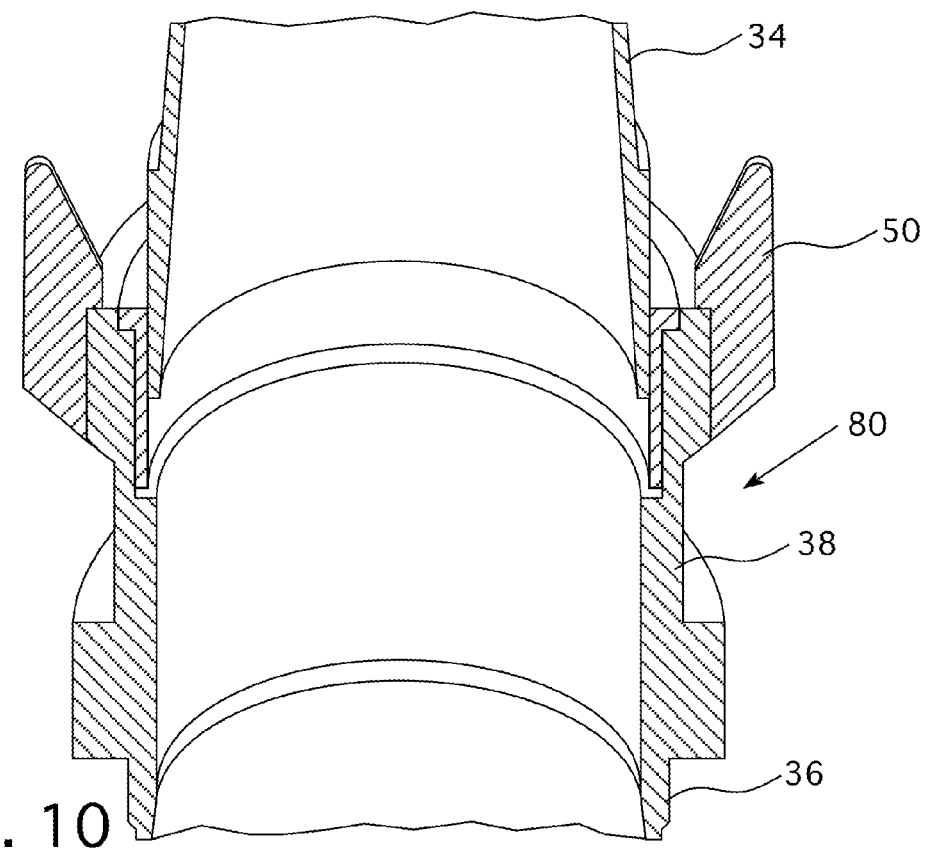
FIG. 10 is a sectional view of the embodiment shown in FIG. 9.

FIG. 9 illustrates another embodiment for repairing damaged jet pump surfaces and/or reducing/eliminating flow induced vibration. According to the embodiment shown in FIG. 9, damaged material on the inside diameter of the diffuser is resurfaced. FIG. 10 is a sectional view of the embodiment shown in FIG. 9. A new internal collar 78 is inserted into the diffuser collar 38, restoring it to at least its original designed inside diameter, or even narrowing the annular gap between the inlet mixer and the diffuser collar. The originally engineered manufactured tolerance gap for the slip joint between the inlet mixer outside diameter and the diffuser collar is very tight, plus/minus 0.010 inch diametrically. It should be appreciated that the new internal collar may also be structured to form a convergent geometry relative to the outside diameter of the inlet mixer.

Figure 12:
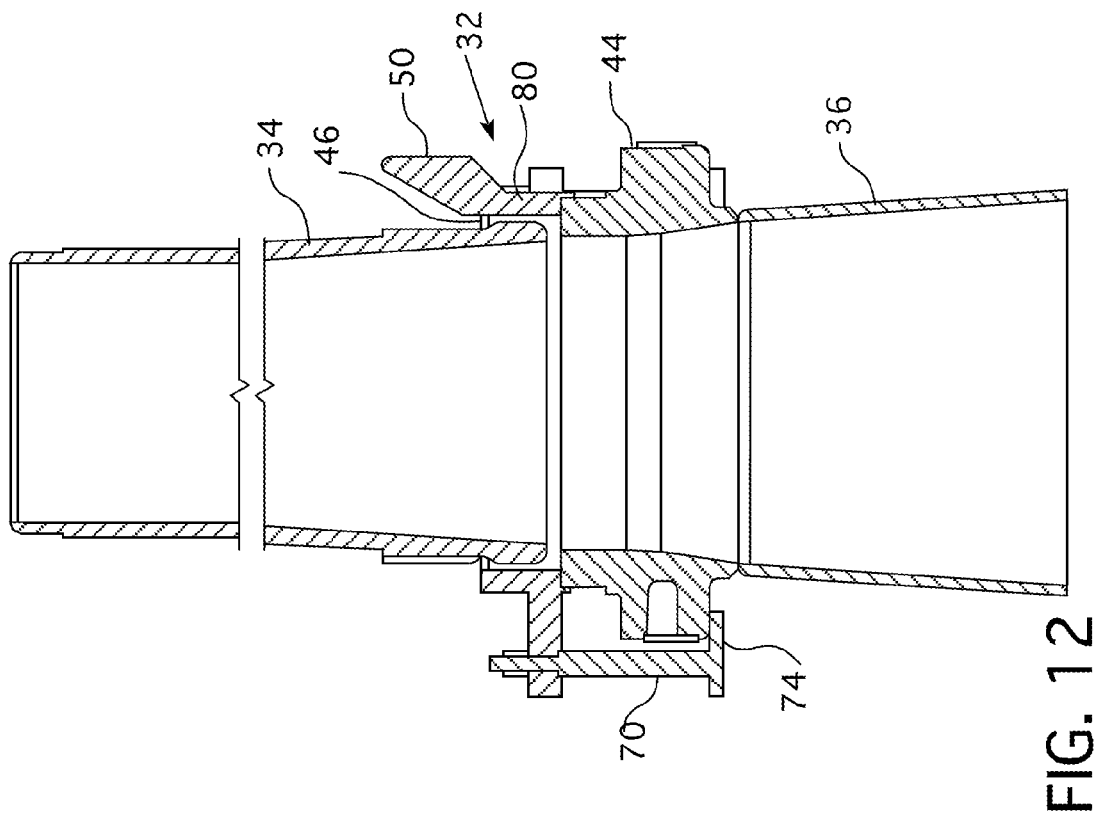
FIG. 12 is a sectional view of the embodiment shown in FIG. 11.
Figure 11:
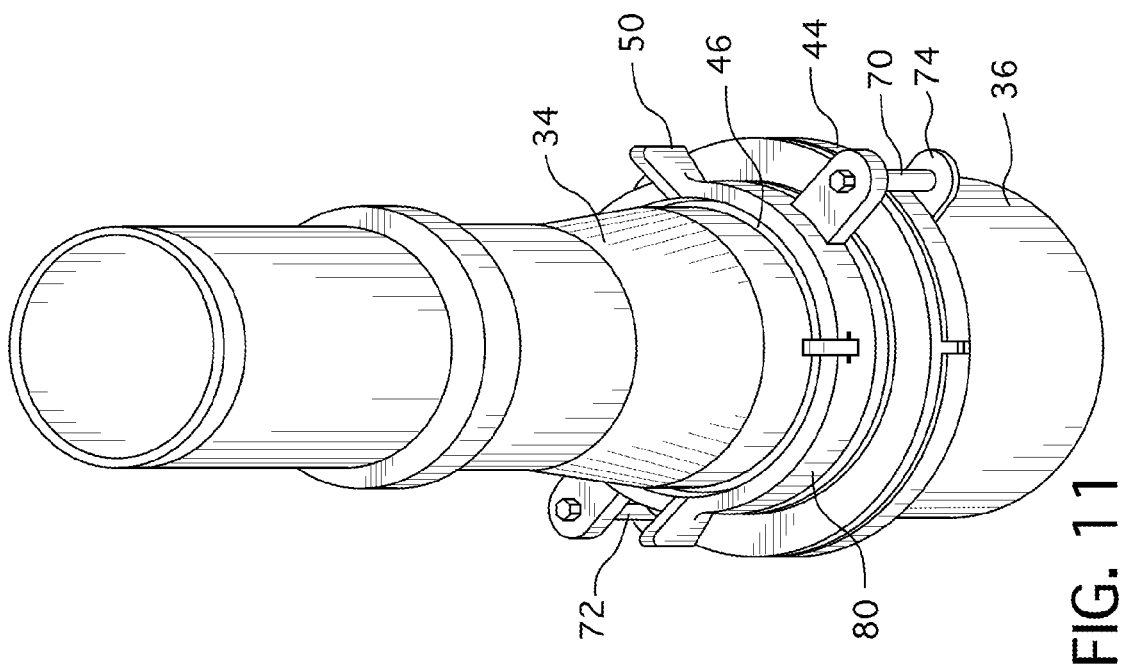
FIG. 11 is a perspective view of a third embodiment of this invention.

According to another embodiment of the present invention, the inlet mixer is left in place, but the diffuser collar portion 38 of the diffuser is cut and removed. A new casting or spool piece 80 is then secured to the diffuser 36 (FIGS. 11 and 12). This allows the slip joint geometry to be tightly controlled. This spool piece can be a single section (which may require the removal of the inlet mixer for installation) or multiple sections (i.e., like a clam shell) which may allow for the inlet mixer to in situ install. Again, the geometric relationship between the inlet mixer and the diffuser can be structured such that the inlet mixer outside diameter surface and the diffuser inside diameter surface converge.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of repairing a slip joint on a jet pump assembly between an inlet mixer and a diffuser, the diffuser having an opening that receives the inlet mixer with a given spacing between an outside diameter of the inlet mixer and an inside diameter of the opening in the diffuser forming an annulus, with the given spacing a product of manufacture and vibration wear, the method comprises the steps of:
   remotely accessing the annulus; and
   narrowing a radial dimension of the annulus to narrow the annulus to a preselected radial dimension, which is greater than zero, so a defined space exists around the entire annulus, between the inlet mixer and the diffuser or between the inlet mixer and any component attached to the diffuser, so that no portion of the inlet mixer touches the diffuser or any component attached to the diffuser when the inlet mixer is centered within the diffuser, so the inlet mixer is configured to slide within the diffuser.

2. The method of claim 1 including the steps of:
   measuring a dimension of the outside diameter of the inlet mixer that fits within the slip joint;
   fabricating a collar clamp having a generally circular clamp opening with a designed inside diameter that is larger than the outside diameter of the inlet mixer and smaller than a maximum extent of the outside diameter of the diffuser opening;
   fitting the collar clamp around the inlet mixer and at least partially over and above the diffuser opening with the collar clamp supported by the diffuser; and
   attaching the collar clamp to a portion of a diffuser housing below the collar clamp.

3. The method of claim 2 wherein the measuring step measures dimensions around the diffuser opening.

4. The method of claim 2 wherein the diffuser has guides spaced circumferentially around a housing of the diffuser, with the guides extending above the opening in the diffuser that receives the inlet mixer, including the steps of:
   forming notches in an underside of the collar clamp, in-line with the guides; and
   fitting the notches over the guides wherein the guides restrain rotation of the collar clamp.

5. The method of claim 2 wherein the clamp effectively optimizes the insertion depth of the inlet mixer within the diffuser opening.

6. The method of claim 2 wherein the collar clamp is fabricated in at least two circumferential sections with each of the sections fastening together to form the generally circular collar clamp opening.

7. The method of claim 2 wherein the attaching step clamps the collar clamp to the portion of the diffuser housing.

8. The method of claim 7 wherein the portion of the diffuser housing is a radially, outwardly extending, integral collar on the diffuser housing.

9. The method of claim 8 wherein the collar clamp has at least two radially, outwardly extending segments that extend radially further than the diffuser collar, the outwardly extending segments have a vertical opening there through, a tie bar having a radially, inwardly extending lip at one end, has the lip positioned under the diffuser collar and a second end of the tie bar extends through one of the openings in the segments and is captured on another side of the opening to tighten the collar clamp down against the diffuser collar.

10. The method of claim 7 wherein the attaching step clamps the collar clamp to the portion of the diffuser housing at a plurality of discrete circumferential locations around the housing.

11. The method of claim 2 that does not require the step of removing the inlet mixer from the diffuser.

12. The method of claim 2 wherein the collar clamp has an axially extending convergent surface that faces an outer surface of the inlet mixer when the collar clamp is fitted around the inlet mixer.

13. The method of claim 2 wherein the collar clamp rests on a lip of the diffuser opening.

14. The method of claim 13 wherein a lower side of the collar clamp has an annular circumferential groove adjacent the generally circular collar clamp opening, the annular groove having a generally "L" shape in the radial direction with one leg of the "L" extending in a horizontal direction and resting on a lip of the diffuser opening.

15. The method of claim 14 wherein a second leg of the "L" contacts an outer wall of the diffuser.

16. The method of claim 2 including the step of inserting a gasket between the clamp and a lip of the diffuser opening.

17. The method of claim 1 wherein the step of narrowing the radial dimension of the annulus comprises the steps of:
   removing the inlet mixer from the diffuser;
   machining an inside surface of the diffuser opening; and
   inserting an internal collar having an outside diameter substantially equal to an inside diameter of the machined inside surface of the diffuser opening and having an inside diameter that narrows the annulus when the inlet mixer is inserted into the diffuser opening so that the annulus has a radial dimension that is less than the given spacing.

18. The method of claim 17 wherein the internal collar is fabricated to have an axially convergent contour on a surface that opposes an outer surface of the inlet mixer.

19. The method of claim 1 wherein the preselected radial dimension of the annulus is narrowed to be equal to or smaller than a corresponding original equipment manufacturer specification.

20. The method of claim 1 wherein the step of narrowing the radial dimension of the annulus comprises the steps of:
   cutting a collar portion of the diffuser that surrounds the inlet mixer from a remainder of the diffuser;
   removing the collar portion of the diffuser from the remainder of the diffuser and the inlet mixer;

fabricating a spool piece having a replacement opening with a desired inside diameter to replace the collar portion of the diffuser; and securing the spool piece to the rest of the diffuser with an end of the inlet mixer within the replacement opening.

21. The method of claim 20 wherein the spool piece is fabricated to have an axially convergent contour on a surface that opposes an outer surface of the inlet mixer.

* * * * *